(12) United States Patent
Lee et al.

(10) Patent No.: US 9,285,835 B2
(45) Date of Patent: Mar. 15, 2016

(54) FLEXIBLE DISPLAY DEVICE AND METHOD OF MANUFACTURING THE SAME

(71) Applicant: LG Display Co., Ltd., Seoul (KR)

(72) Inventors: Dal Jae Lee, Seoul (KR); Byung hwee Park, Daegu (KR); Jung Joo Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 84 days.

(21) Appl. No.: 14/135,787

(22) Filed: Dec. 20, 2013

(65) Prior Publication Data

US 2014/0240933 A1 Aug. 28, 2014

(30) Foreign Application Priority Data

Feb. 28, 2013 (KR) .................. 10-2013-0022517

(51) Int. Cl.
*G06F 1/16* (2006.01)
(52) U.S. Cl.
CPC ............ *G06F 1/1656* (2013.01); *G06F 1/1652* (2013.01); *Y10T 29/49128* (2015.01)
(58) Field of Classification Search
CPC .................................................. G06F 1/1656
See application file for complete search history.

(56) References Cited

U.S. PATENT DOCUMENTS

| | | |
|---|---|---|
| 2007/0019378 A1 | 1/2007 | Kwon |
| 2007/0126721 A1 | 6/2007 | Kurokawa |
| 2009/0207155 A1 | 8/2009 | Affolter et al. |
| 2009/0213292 A1 | 8/2009 | Park et al. |
| 2011/0115364 A1 | 5/2011 | Kim |
| 2013/0002133 A1 | 1/2013 | Jin et al. |
| 2013/0002583 A1 | 1/2013 | Jin et al. |
| 2014/0118221 A1* | 5/2014 | Park et al. ...................... 345/1.3 |
| 2015/0153607 A1 | 6/2015 | Chen et al. |

FOREIGN PATENT DOCUMENTS

| | | |
|---|---|---|
| CN | 202171790 U | 3/2012 |
| EP | 2 541 371 A2 | 2/2013 |
| JP | H09189919 A | 7/1997 |
| JP | H10333174 A | 12/1998 |
| JP | 2006195309 A | 7/2006 |
| WO | 2011/048424 A2 | 4/2011 |

* cited by examiner

*Primary Examiner* — Timothy L Rude
(74) *Attorney, Agent, or Firm* — Morgan, Lewis & Bockius LLP (57) ABSTRACT

Disclosed is a flexible display device. The flexible display device includes a display panel configured to include a first substrate that includes a plurality of pixels and a second substrate that is facing-coupled to the first substrate, and a first flexible circuit board connected to the first substrate. A driving IC which supplies a driving signal to the display panel is mounted on the first flexible circuit board. The first substrate includes a display part covered by the second substrate and configured to include the plurality of pixels, a non-display part provided near the display part and coupled to the second substrate, a bending part configured to extend from one side of the non-display part, and bent at a certain curvature, and a pad part connected to one side of the first flexible circuit board.

16 Claims, 8 Drawing Sheets

FIG. 1

Related Art

FLEXIBLE DISPLAY DEVICE AND METHOD OF MANUFACTURING THE SAME

CROSS-REFERENCE TO RELATED APPLICATIONS

This application claims the benefit of Korean Patent Application No. 10-2013-0022517 filed on Feb. 28, 2013, the entire disclosure of which is hereby incorporated by reference as if fully set forth herein for all purposes.

BACKGROUND

1. Field of the Disclosure

The following disclosure relates to a display device, and more particularly, to a flexible display device with a reduced bezel width and a method of manufacturing the same.

2. Discussion of the Related Art

Generally, in flexible display devices, a plurality of pixels are formed on a thin and flexible substrate such as plastic, and thus, even when the flexible display devices are folded or rolled up as in paper, the flexible display devices can display a desired image. Therefore, the flexible display devices are attracting much attention as next-generation display devices, and research and development thereof are being done.

Examples of such flexible display devices include flexible liquid crystal display devices, flexible plasma display devices, flexible organic light emitting display devices, flexible electrophoretic display devices, flexible electro-wetting display devices, etc.

Figure 1:
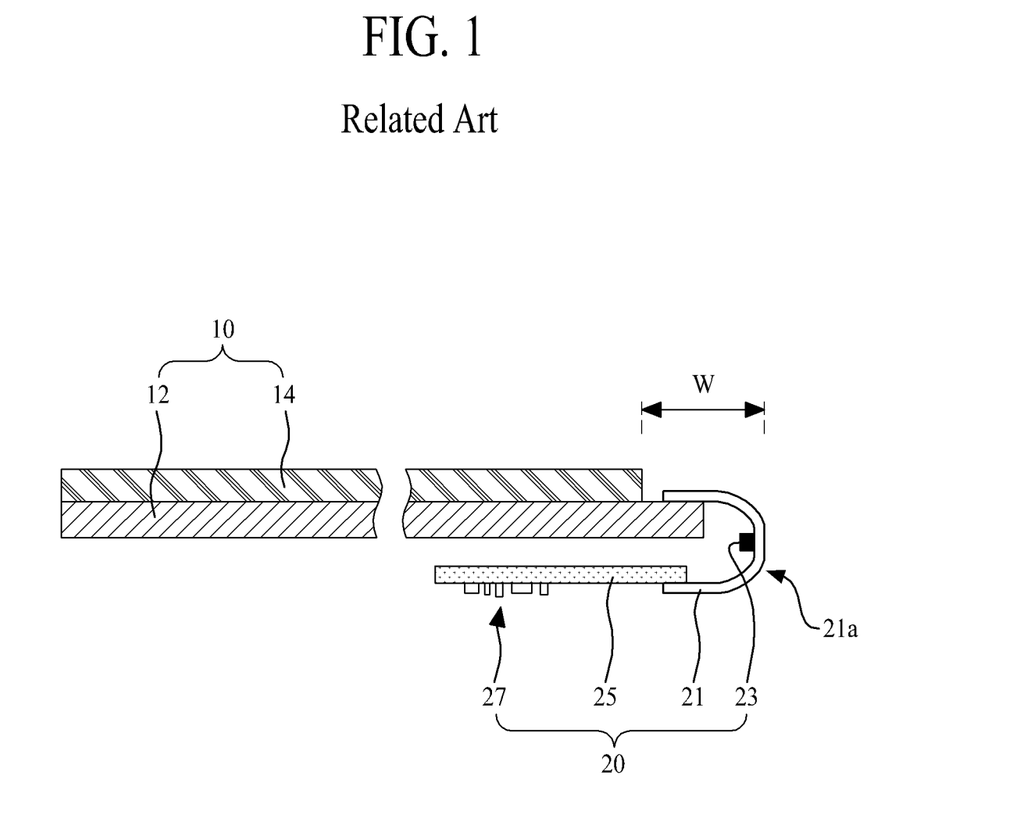
FIG. 1 is a cross-sectional view schematically illustrating a general flexible display device.

FIG. 1 is a cross-sectional view schematically illustrating a related art flexible display device.

With reference to FIG. 1, the general flexible display device includes a display panel 10 and a panel driver 20.

The display panel 10 includes a lower substrate 12 and an upper substrate 14 which are facing and coupled (i.e., "facing-coupled") to each other.

The lower substrate 12 is formed as a thin and flexible substrate such as plastic. The lower substrate 12 includes a display area that includes a plurality of pixels for displaying an image, a peripheral area that surrounds the display area, and a pad part that is provided in a peripheral area of one side of the lower substrate 12.

For example, a plurality of gate lines and a plurality of data lines that define a plurality of pixel areas are formed to intersect each other in the display area, a thin film transistor (TFT) is formed in an area defined by an intersection of a corresponding gate line and data line, and a pixel electrode connected to the TFT is formed in each of the pixel areas. The pad part is provided in the peripheral area of the one side of the lower substrate 12 to be connected to the gate lines and the data lines, and is connected to the panel driver 20.

The upper substrate 14 is formed as a thin and transparent substrate such as plastic, and formed to have an area relatively less than the lower substrate 12. The upper substrate 14 is facing-coupled to a portion of the lower substrate 12 (except the pad part of the lower substrate 12) by a coupling member (not shown), which is formed as a closed-loop type, in a non-display area of the lower substrate 12.

An optical film (not shown) may be adhered to a top of the upper substrate 14, in which case the optical film may have an anti-reflection function that prevents polarization and/or reflection of external light.

The panel driver 20 is connected to the pad part of the lower substrate 12, and supplies signals to the gate lines and data lines. To this end, the panel driver 20 may include a flexible circuit board 21, a driving integrated circuit (IC) 23, a control board 25, and a driving circuit part 27.

The flexible circuit board 21 is adhered to the pad part of the lower substrate 12, and bent around to a bottom of the lower substrate 12 to thereby surround a side surface of the lower substrate 12.

The driving IC 23 is mounted on the flexible circuit board 21. The driving IC 23 generates data signals and a pixel driving signal for displaying an image on the display panel 10 on the basis of image data and a timing sync signal which are supplied from the control board 25, and supplies the data signals and the pixel driving signal to the pad part.

The control board 25 is adhered to the flexible circuit board 21, and is disposed at the bottom of the lower substrate 12. The control board 25 is connected to a system board (not shown) that generates image data and the timing sync signal which correspond to an image to be displayed by the display panel 10, and transfers the image data and timing sync signal, which are supplied from the system board, to the driving IC 23 through the flexible circuit board 21.

The driving circuit board 27 is mounted on the control board 25, and includes passive elements, such as a resistor, a capacitor, and an inductor, and/or an IC. The driving circuit board 27 generates a voltage necessary to drive the display panel 10 and/or the driving IC 23.

Such a related art flexible display device drives the pixels of the display panel 10 according to a driving of the panel driver 20, thereby displaying a desired image on the display panel 10.

However, in the related art flexible display device, the panel driver 20 (e.g., the flexible circuit board 21) is bent to surround a side surface of the lower substrate 12, and a portion of the flexible circuit board 21 and a bending part 21a are disposed at a side surface of the display panel 10. Due to this portion of the flexible circuit board 21 and the bending part 21a, a bezel width W increases.

SUMMARY

Accordingly, present embodiments are directed to providing a flexible display device and a method of manufacturing the same that substantially obviate one or more problems due to limitations and disadvantages of the related art.

An object of the present embodiments is directed to providing a flexible display device with a reduced bezel width and a method of manufacturing the same.

Another object of the present embodiments is directed to providing a flexible display device and a method of manufacturing the same, which can simplify a manufacturing process and reduce the manufacturing cost.

Additional advantages and features of the present embodiments will be set forth in part in the description which follows and in part will become apparent to those having ordinary skill in the art upon examination of the following or may be learned from practice of the embodiments. The objectives and other advantages of the embodiments may be realized and attained by the structure particularly pointed out in the written description and claims hereof as well as the appended drawings.

To achieve these and other advantages and in accordance with the present embodiments, as embodied and broadly described herein, there is provided a flexible display device including: a display panel configured to include a first substrate that includes a plurality of pixels and a second substrate that is facing-coupled to the first substrate, and a first flexible circuit board connected to the first substrate, wherein a driving IC which supplies a driving signal to the display panel is mounted on the first flexible circuit board, wherein the first substrate includes: a display part covered by the second substrate, and configured to include the plurality of pixels, a non-display part provided near the display part, and coupled to the second substrate, a bending part configured to extend from one side of the non-display part, and bent at a certain curvature, and a pad part connected to one side of the first flexible circuit board.

In another aspect of the present embodiments, there is provided a method of manufacturing a flexible display device, including: providing a first substrate that includes a display part including a plurality of pixels, a non-display part provided near the display part, a bending part extending from one side of the non-display part, and a pad part, providing a second substrate that overlaps the display part and the non-display part except the bending part and a circuit mounting part, facing-coupling the first substrate to the second substrate with an adhesive member that is provided at the non-display part, connecting a first flexible circuit board to a pad part of the first substrate, wherein a driving IC which supplies a driving signal to the plurality of pixels is mounted on the first flexible circuit board, and bending the bending part at a certain curvature to dispose the driving IC at a bottom of the first substrate.

It is to be understood that both the foregoing general description and the following detailed description are exemplary and explanatory and are intended to provide further explanation of the embodiments as claimed.

BRIEF DESCRIPTION OF THE DRAWINGS

The accompanying drawings, which are included to provide a further understanding of the embodiments and are incorporated in and constitute a part of this application, illustrate embodiments and together with the description serve to explain principles of the embodiments. In the drawings.

DETAILED DESCRIPTION

In the specification, in adding reference numerals for elements in each drawing, it should be noted that like reference numerals may be used to denote like elements in other drawings.

The terms described in the specification should be understood as follows.

As used herein, the singular forms "a", "an" and "the" are intended to include the plural forms as well, unless the context clearly indicates otherwise. The terms "first" and "second" are for differentiating one element from the other element, and these elements should not be limited by these terms.

It should be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

The term "on" should be construed as including a case where one element is formed at a top of another element and moreover a case where a third element is disposed therebetween.

Hereinafter, a flexible display device and a method of manufacturing the same according to embodiments will be described in detail with reference to the accompanying drawings.

First Embodiment

Figure 2:
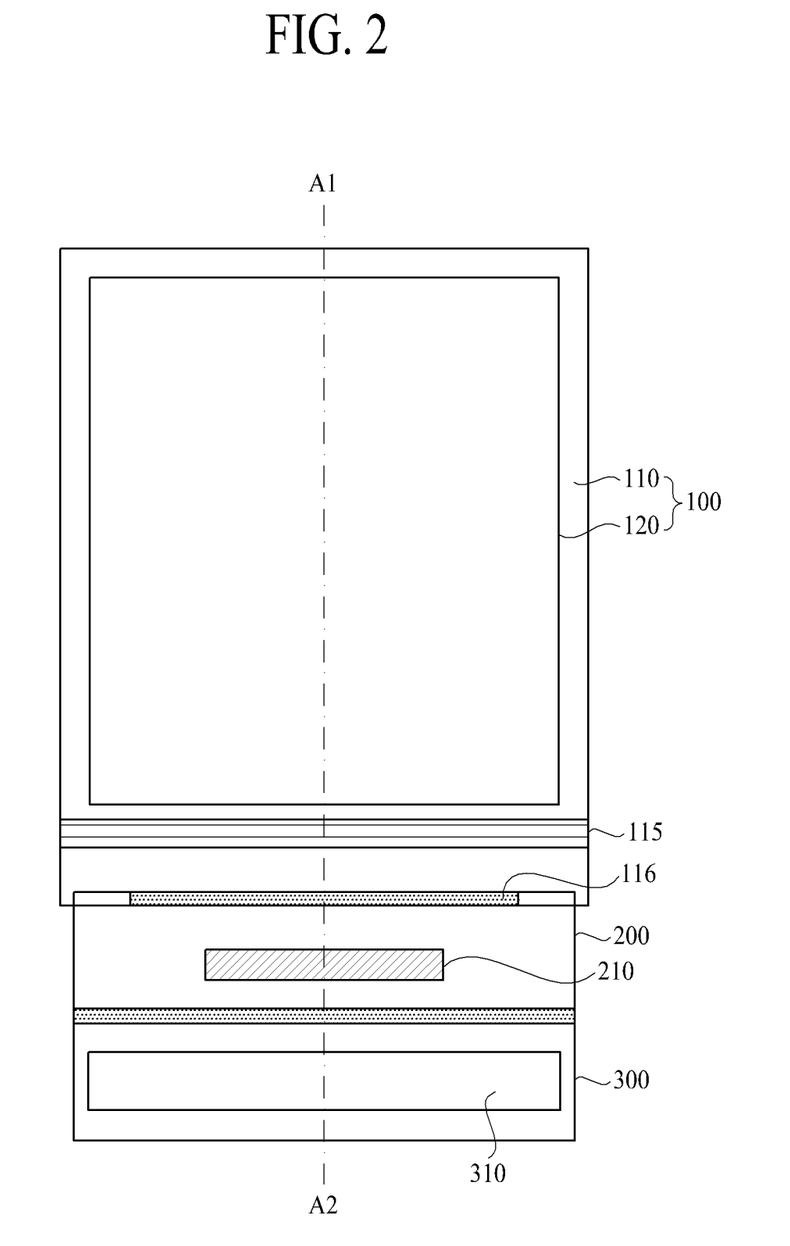
FIG. 2 is a plan view illustrating a flexible display device according to a first embodiment.
Figure 3A:
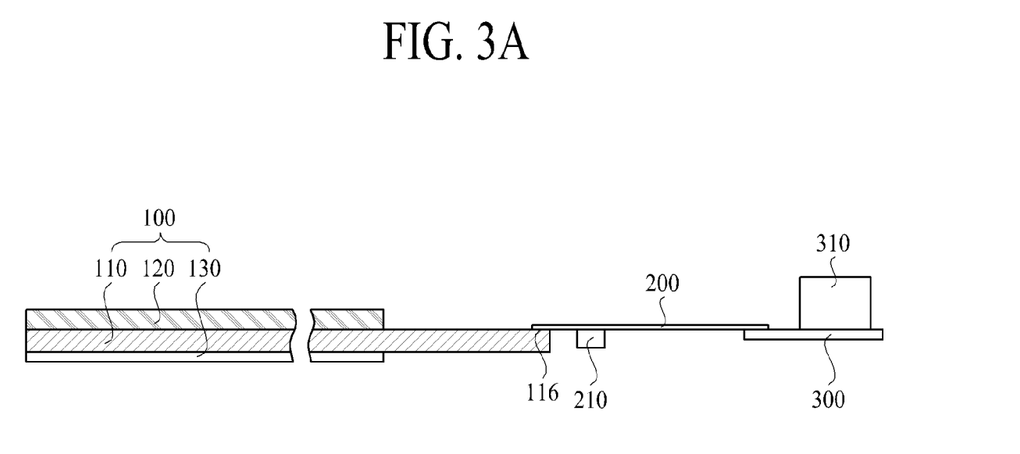
FIGS. 3A and 3B are cross-sectional views taken along line A1-A2 of FIG. 2.
Figure 3B:
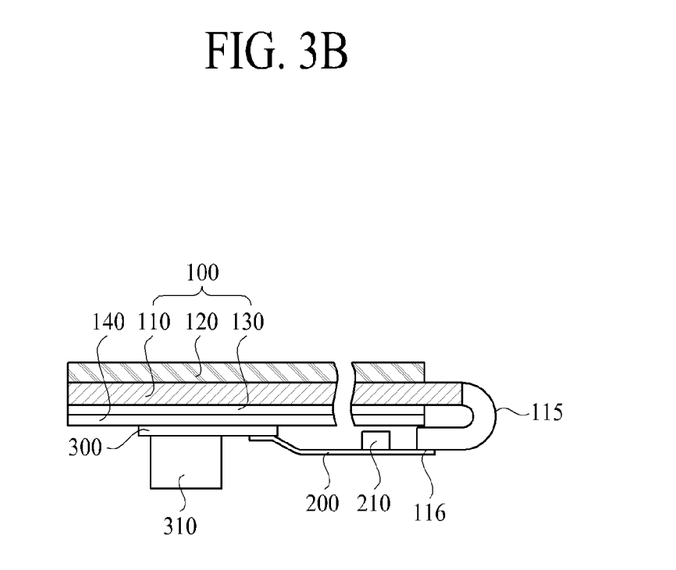

FIG. 2 is a plan view illustrating a flexible display device according to a first embodiment, and FIGS. 3A and 3B are cross-sectional views taken along line A1-A2 of FIG. 2.

FIG. 3A illustrates a first substrate 110 before being bent in a process of manufacturing the flexible display device according to the first embodiment, and FIG. 3B illustrates the first substrate 110 which has been bent to a rear surface of a display panel 100.

With reference to FIGS. 2, 3A and 3B, the flexible display device according to the first embodiment may include the display panel 100 and a panel driver.

The display panel 100 may be a flexible flat panel display device. In the following description, the display panel 100 may be an organic light emitting display panel of a flexible organic light emitting display device, where the flexible organic light emitting display device may be a type of flexible flat panel display device.

The display panel 100 may include first and second substrates 110 and 120 which may be facing and coupled (i.e., "facing-coupled") to each other, a back plate 130 and a light blocking member 140 that may be provided under the first substrate 110, and an optical film (not shown) that may be formed at a top of the second substrate 120.

The first substrate 110 may be a flexible thin film substrate, and may be formed, for example, of a plastic material or a metal foil.

For example, the first substrate 110 formed of the plastic material may be formed of one of polyimide (PI), polycarbonate (PC), polynorborneen (PNB), polyethyleneterephthalate (PET), polyethylenapthanate (PEN), and polyethersulfone (PES).

The first substrate 110 may include a display part that may have a plurality of pixels and may be covered by the second substrate 120, a non-display part that may be provided near the display part and may be coupled to the second substrate 120, a bending part 115 that may extend from one side of the non-display part and may be bent at a certain curvature, and a pad part 116.

The display part of the first substrate 110 may include a plurality of gate lines (not shown), a plurality of data lines (not shown), a plurality of driving power lines (not shown), the plurality of pixels (not shown), and a cathode power line (not shown).

The plurality of gate lines may be arranged at certain intervals to intersect the plurality of data lines, and the plurality of driving power lines may be arranged in parallel to the plurality of gate lines or the plurality of data lines.

The plurality of pixels may be respectively formed in a plurality of pixel areas defined by intersections between the plurality of gate lines and the plurality of data lines, and may display an image according to a gate signal from the gate lines and data signals from the respective data lines. To this end, each of the plurality of pixels may include a pixel driving circuit (not shown) connected to a corresponding gate line and data line and an organic light emitting element (not shown) connected to the pixel driving circuit and the cathode power line.

The pixel driving circuit may include a switching transistor (not shown) connected to a corresponding gate line and data line, a driving transistor (not shown) connected to the switching transistor, and a capacitor connected to a gate and source of the driving transistor.

The pixel driving circuit may supply a data signal, supplied to the corresponding data line through the switching transistor which may be turned on according to the gate signal supplied through the corresponding gate line, to the driving transistor to store a gate-source voltage of the driving transistor corresponding to the data signal in the capacitor.

The driving transistor may be turned on with the voltage stored in the capacitor, and supply a data current corresponding to the data signal to the organic light emitting element. Here, each of the transistors may be an Si thin film transistor (TFT), a poly-Si TFT, an oxide TFT, or an organic TFT.

The pixel driving circuit may further include at least one compensation transistor and at least one compensation capacitor that compensate for a threshold voltage of the driving transistor.

The organic light emitting element may include a pixel electrode (or an anode electrode) connected to the driving transistor, an organic emitting layer (not shown) formed on the pixel electrode, and a cathode electrode (not shown) formed on the organic emitting layer. The organic light emitting element may emit light according to a data current which flows from the pixel electrode to the cathode electrode according to the driving transistor being turned on, and may emits light with a luminance corresponding to the data current onto the second substrate 120.

The cathode power line may be provided at an entire surface of the display part to be electrically connected to the cathode electrode of each pixel, or may be provided in the form of patterns to be electrically connected to the respective cathode electrodes of a plurality of pixels formed on a vertical line or horizontal line of the display part. The cathode power line may be provided to be electrically connected to the organic emitting layer of each pixel, in which case the cathode electrode may not be provided.

The non-display part may be provided as a peripheral area of the display part to surround the display part, and may define the display part. Here, the non-display part may be defined as an area overlapping an edge portion of the second substrate 120.

A plurality of link lines (not shown), electrically connected to the plurality of gate lines, the plurality of data lines, the plurality of driving power lines, and the cathode power line which may be provided in the display part, may be provided at one side of the non-display part.

The bending part 115 may extend from the one side of the non-display part to have a certain area, and may be bent to be under the first substrate 110. For example, the bending part 115 may be bent by a substrate bending apparatus (not shown) to have a certain curvature, and overlap a lower portion of one side of the second substrate 120. A plurality of extension lines (not shown) electrically connected to the respective link lines may be provided at the bending part 115.

The pad part 116 of the first substrate 110 may be electrically connected to a first flexible circuit board 200 of the panel driver.

It is illustrated in the FIG. 3B example that the bending part 115 may be bent to be separated from a bottom of the light blocking member 140 at a certain step height, but the bending part 115 may be bent to be closely adhered to the bottom of the light blocking member 140 without being limited thereto. In this case, a thickness of the display panel 100 can be minimized.

The second substrate 120 of the display panel 100 may be formed of a transparent plastic material, and may be formed to have an area relatively less than the first substrate 110. The second substrate 120 may be facing-coupled to an inner portion of the bending part 115 of the first substrate 110 by a coupling member (not shown) which may be formed in a closed-loop type at the non-display part of the first substrate 110.

The coupling member may couple the first substrate 110 to the second substrate 120, where these substrates are facing each other, (e.g., the coupling member may "facing-couple" the first substrate 110 to the second substrate 120), and may seal a space between the first and second substrates 110 and 120 for protecting the organic light emitting element against external moisture or oxygen.

The back plate 130 may be provided at a bottom of the first substrate 110, and the light blocking member 140 may be provided at a bottom of the back plate 130. The light blocking member 140 may prevent light, emitted from the display part of the first substrate 110, from traveling in a lower direction of the first substrate 110. The light blocking member 140 may use, for example, a single-sided adhesive tape or a double-sided adhesive tape for blocking light.

The light blocking member 140 may be formed as a coating layer formed of a black tape or a light blocking material. The light blocking member 140 may be formed to overlap the bottom of the first substrate 110 except for the bending part 115 of the first substrate 110, the first flexible circuit board 200, and a second flexible circuit board 300 which may be included in the panel driver.

The optical film may be formed to have an anti-reflection function that prevents polarization and/or reflection of external light, and may be adhered to a top of the second substrate 120. The optical film may not be provided.

The panel driver may be configured with the first flexible circuit board 200 and the second flexible circuit board 300.

The first flexible circuit board 200 may use a chip-on-film (COF). A driving IC 210 that supplies a control signal and a driving signal for emitting light from the pixels of the display panel 100 may be provided at the first flexible circuit board 200.

The second flexible circuit board 300 may use a flexible printed circuit (FPC), and a plurality of driving elements for supplying a control signal and image signals (input from a control board (not shown)) to the driving IC 210 may be provided at the second flexible circuit board 300 in a surface mounting type. Also, a protection cap 310 for protecting the driving elements may be formed at the second flexible circuit board 300.

The protection cap 310 may cover the driving elements mounted on the second flexible circuit board 300 to protect the driving elements. In addition, the protection cap 310 may support the display panel 100 and may prevent an electrical connection between the driving elements.

One side of the first flexible circuit board 200 may be electrically connected to a pad part 116 of the first substrate 110, and the other side may be electrically connected to the second flexible circuit board 300.

The driving IC 210 may be mounted on the first flexible circuit board 200 by a chip bonding process or a surface mounting process, and may be bonded to a plurality of signal supply terminals and a plurality of signal input terminals.

The driving IC 210 may generate data signals and a gate signal on the basis of video data and a timing sync signal which may be supplied from the outside through the plurality of signal input terminals, and may supply the generated data signals and gate signal to corresponding signal supply terminals to drive the respective pixels formed in the display part of the first substrate 110, displaying an image corresponding to the video data on the display part.

In one example, one side of the first flexible circuit board 200 may be electrically connected to the pad part 116, and the other side may be electrically connected to the second flexible circuit board 300.

As illustrated in FIG. 3A, the driving IC 210 may be provided at a bottom of the first flexible circuit board 200. In one example, as illustrated in FIG. 3B, when the bending part 115 of the first substrate 110 may be bent, the driving IC 210 may be disposed between the back plate 130 and the first substrate 110.

In addition, as illustrated in the FIG. 3A example, the driving elements may be provided at a top of the second flexible circuit board 300. In this case, as illustrated in the FIG. 3B example, when the bending part 115 of the first substrate 110 is bent, a bottom of the second flexible circuit board 300 may be adhered to the bottom of the back plate 130 by an adhesive member, and the top of the second flexible circuit board 300 may face toward a downward direction.

The adhesive member may function as light blocking member 140, but the light blocking member 140 can also be made of other material.

As described above, the driving elements may be provided at one surface of the second flexible circuit board 300, and the other surface may be adhered to the bottom of the back plate 130 by the adhesive member.

Therefore, because the second flexible circuit board 300 may be adhered to the bottom of the back plate 130, an elastic restoring force of the bending part 115 may be restricted, and a bent shape of the bending part 115 can be maintained as-is.

A method of manufacturing the flexible display device according to the first embodiment including the above-described elements will now be described.

The first and second substrates 110 and 120 of the display panel 100 may be facing-coupled to each other, and the back plate 130 may be provided at the bottom of the first substrate 110.

Subsequently, the first flexible circuit board 200 with the driving IC 210 provided therein may be connected to the pad part 116 of the first substrate 110. Also, the second flexible circuit board 300 with the driving elements provided therein may be connected to the first flexible circuit board 200.

Subsequently, the bending part 115 of the first substrate 110 may be bent to under the first and second substrates 110 and 120.

Subsequently, the bottom of the second flexible circuit board 300 may be adhered to the bottom of the back plate 130, which may be provided at a bottom of the first substrate 110, by using the light blocking member 140. The second flexible circuit board 300 may be adhered to the bottom of the back plate 130, and thus, a bent shape of the bending part 115 may be maintained as-is.

In the above-described flexible display device according to the first embodiment, the bending part 115 extending from one side of the first substrate 110 may be bent, and a bezel width W can be reduced.

In the flexible display device according to an embodiment, positions at which the driving IC 210, driving elements, and protection cap 310 of the panel driver and the pad part 116 of the first substrate 100 may be respectively provided may be changed depending on a bending structure and slimming structure of the display panel 100.

Second Embodiment

Figure 4:
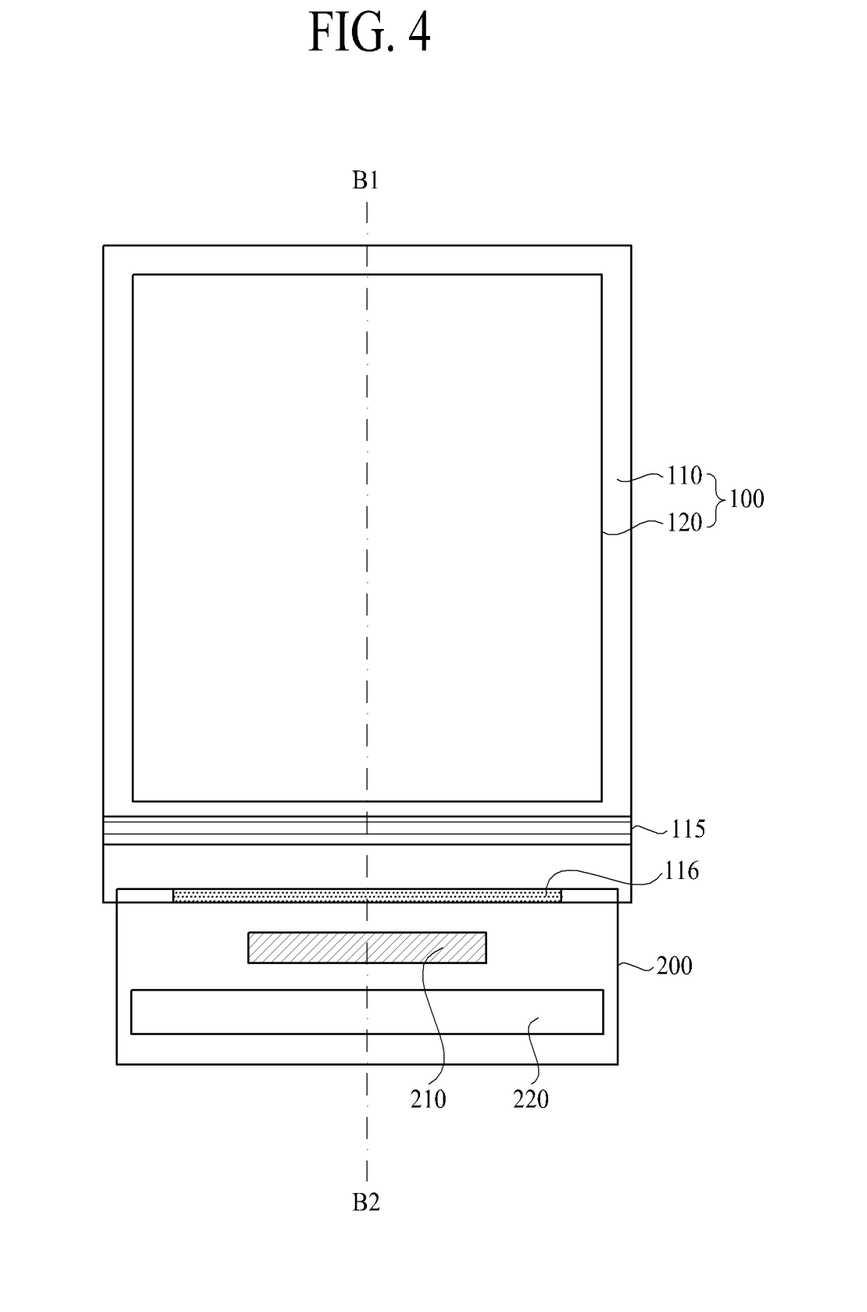
FIG. 4 is a plan view illustrating a flexible display device according to a second embodiment.
Figure 5A:
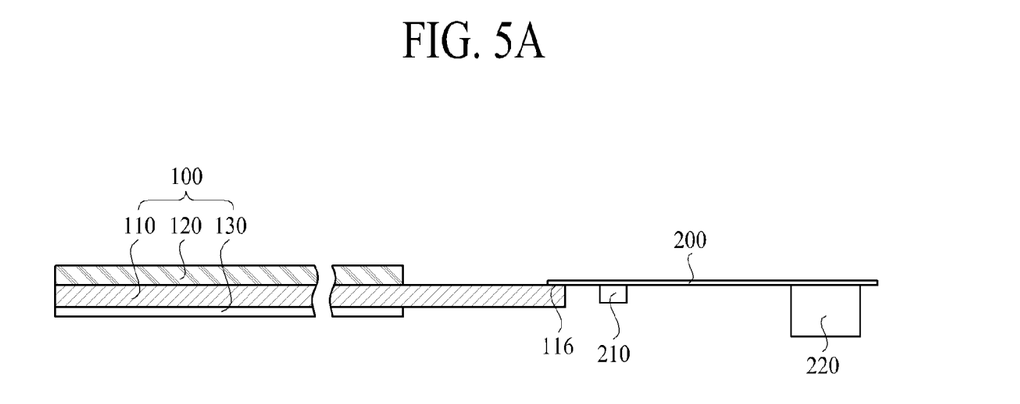
FIGS. 5A and 5B are cross-sectional views taken along line B1-B2 of FIG. 4.
Figure 5B:
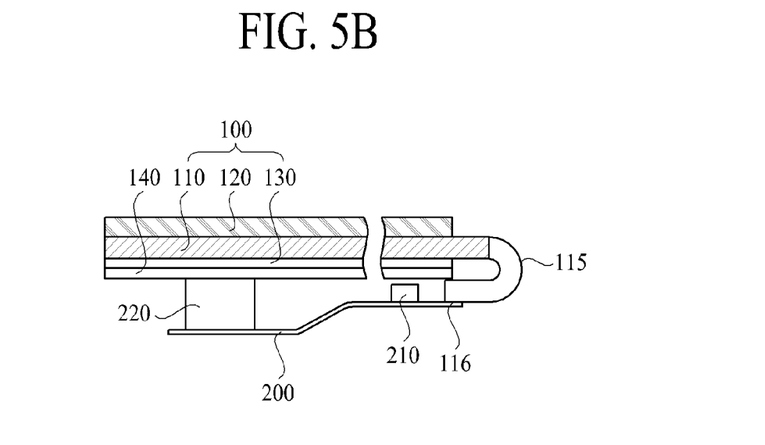

FIG. 4 is a plan view illustrating a flexible display device according to a second embodiment, and FIGS. 5A and 5B are cross-sectional views taken along line B1-B2 of FIG. 4.

FIG. 5A illustrates a first substrate 110 before being bent in a process of manufacturing the flexible display device according to the second embodiment, and FIG. 5B illustrates the first substrate 110 which has been bent to a rear surface of a display panel 100.

With reference to FIGS. 4, 5A, and 5B, the flexible display device according to the second embodiment may include the display panel 100 and a panel driver.

The display panel 100 may be the same as or similar to that of the first embodiment described above with reference to FIGS. 2 to 3B, and thus, its detailed description is not provided.

The display panel 100 may include first and second substrates 110, 120, which may be facing-coupled to each other, and a back plate 130 and a light blocking member 140 that may be provided under the first substrate 110.

The first substrate 110 may be a flexible thin film substrate, and may be formed, for example, of a plastic material or a metal foil.

For example, the first substrate 110 formed of the plastic material may be formed of one of polyimide (PI), polycarbonate (PC), polynorborneen (PNB), polyethyleneterephthalate (PET), polyethylenapthanate (PEN), and polyethersulfone (PES). The first substrate 110 may include a display part, a non-display part, a bending part 115, and a pad part 116.

The bending part 115 may extend from the one side of the non-display part to have a certain area, and may be bent to be under the first substrate 110. That is, the bending part 115 may be bent by a substrate bending apparatus (not shown) to have a certain curvature, and overlap a lower portion of one side of the second substrate 120. A plurality of extension lines (not shown) electrically connected to the respective link lines may be provided at the bending part 115.

The pad part 116 of the first substrate 110 may be electrically connected to a first flexible circuit board 200 of the panel driver.

It is illustrated in the FIG. 5B example that the bending part 115 may be bent to be separated from a bottom of the light blocking member 140 at a certain step height, but the bending part 115 may be bent to be closely adhered to the bottom of the light blocking member 140 without being limited thereto. In this case, a thickness of the display panel 100 can be minimized.

The back plate 130 may be provided at a bottom of the first substrate 110, and the light blocking member 140 may be provided at a bottom of the back plate 130. The light blocking member 140 may prevent light, emitted from the display part of the first substrate 110, from traveling in a lower direction of the first substrate 110.

The light blocking member 140 may be formed as a coating layer formed of a black tape or a light blocking material. The light blocking member 140 may be formed to overlap the bottom of the first substrate 110 except for the bending part 115 of the first substrate 110 and the first flexible circuit board 200 included in the panel driver.

The panel driver may include a driving IC 210 and a plurality of driving elements which may be provided at the first flexible circuit board 200. For example, the first flexible circuit board 200 may use the COF or the FPC.

The driving elements may supply a control signal and image signals (input from a control board (not shown)) to the driving IC 210, and a protection cap 220 for protecting the driving elements may be provided.

The protection cap 220 may cover the driving elements mounted on the first flexible circuit board 200 to protect the driving elements. In addition, the protection cap 220 may support the display panel 100 and may prevent an electrical connection between the driving elements.

The driving IC 210 may be mounted on a bottom of the first flexible circuit board 200 by a chip bonding process or a surface mounting process, and may be bonded to a plurality of signal supply terminals and a plurality of signal input terminals.

One side of the first flexible circuit board 200 may be electrically connected to a pad part 116 of the first substrate 110, and the other side may be electrically connected to the control board (not shown).

For example, a pad part may also be provided at the first flexible circuit board 200 to be connected to the pad part 116 of the first substrate 110, and the pad part, driving IC 210, and driving elements of the first flexible circuit board 200 may be disposed on the same plane or different planes.

As illustrated in the FIG. 5A example, the driving IC 210, the driving elements, the protection cap 220, and the pad part of the first flexible circuit board 200 may be provided at the bottom of the first flexible circuit board 200. In this case, as illustrated in FIG. 5B, when the bending part 115 of the first substrate 110 is bent, the driving IC 210, the driving elements, and the protection cap 220 may be disposed between the back plate 130 and the first substrate 110.

When the bending part 115 of the first substrate 110 is bent, a top of the protection cap 220 may be adhered to the back plate 130 by the adhesive member, and thus, the first substrate 110 may be fixed. Therefore, because the top of the protection cap 220 provided at the first flexible circuit board 200 may be adhered to the bottom of the back plate 130, an elastic restoring force of the bending part 115 may be restricted, and a bent shape of the bending part 115 can be maintained as-is.

A method of manufacturing the flexible display device according to the second embodiment including the above-described elements will now be described.

The first and second substrates 110 and 120 of the display panel 100 may be facing-coupled to each other, and the back plate 130 may be provided at the bottom of the first substrate 110.

Subsequently, the first flexible circuit board 200 in which the driving IC 210, the driving elements, and the protection cap 220 may be provided may be connected to the pad part 116 of the first substrate 110.

Subsequently, the bending part 115 of the first substrate 110 may be bent to under the first and second substrates 110 and 120.

Subsequently, the top of the protection cap 220 provided at the first flexible circuit board 200 may be adhered to the bottom of the back plate 130, which may be provided at a bottom of the first substrate 110, by using the light blocking member 140. As such, the first flexible circuit board 200 may be adhered to the bottom of the back plate 130, and thus, a bent shape of the bending part 115 may be maintained as-is.

In the above-described flexible display device according to the second embodiment, the bending part 115 extending from one side of the first substrate 110 may be bent, and the bezel width W can be reduced.

Moreover, the driving IC 210, the driving elements, and the protection cap 220 may all be provided at one flexible circuit board (e.g., the first flexible circuit board), thus simplifying a manufacturing process and reducing the manufacturing cost. Also, a spare space equal to an area necessary for connecting two flexible circuit boards can be additionally secured, and thus, a spatial restriction can be solved in terms of design.

Third Embodiment

Figure 6:
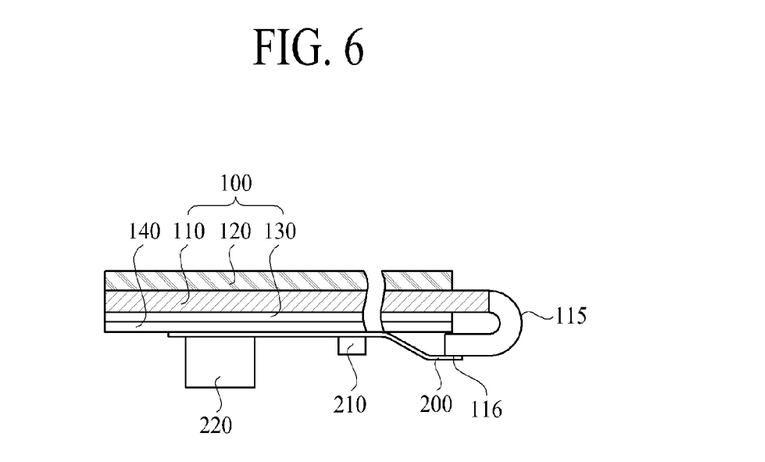
FIG. 6 is a cross-sectional view illustrating a flexible display device according to a third embodiment.

FIG. 6 is a cross-sectional view illustrating a flexible display device according to a third embodiment. In the FIG. 6 example, it is illustrated that a first substrate 110 may be bent to a rear surface of a display panel 100.

Except that a driving IC 210, a plurality of driving elements, and a protection cap 220 may be provided at a top of a first flexible circuit board 200, the flexible display device according to the third embodiment may be the same as or similar to the above-described second embodiment, and thus, a detailed description of elements other than a first substrate 110 and the first flexible circuit board 200 is not provided.

With reference to FIG. 6, the panel driver may include the driving IC 210 and the plurality of driving elements which may be provided at the first flexible circuit board 200. For example, the first flexible circuit board 200 may use a COF or an FPC.

The driving elements may supply a control signal and image signals (input from a control board (not shown)) to the driving IC 210, and a protection cap 220 for protecting the driving elements may be provided.

The driving IC 210 may be mounted on a top of the first flexible circuit board 200 by a chip bonding process or a surface mounting process, and may be bonded to a plurality of signal supply terminals and a plurality of signal input terminals.

One side of the first flexible circuit board 200 may be electrically connected to a pad part 116 of the first substrate 110, and the other side may be electrically connected to the control board (not shown).

For example, a pad part may also be provided at the first flexible circuit board 200 to be connected to the pad part 116 of the first substrate 110. The pad part of the first flexible circuit board 200 may be provided at a bottom of the first flexible circuit board 200, and the driving IC 210 and the driving elements may be provided at a top of the first flexible circuit board 200.

In this case, the driving elements and the protection cap 220 may be provided at the top of the first flexible circuit board 200, and the bottom of the first flexible circuit board 200 may be adhered to the bottom of the back plate 130 by an adhesive member.

Therefore, because the first flexible circuit board 200 may be adhered to the bottom of the back plate 130, an elastic restoring force of the bending part 115 may be restricted, and a bent shape of the bending part 115 may be maintained as-is.

Except that the driving elements and the protection cap 220 may be provided at the top of the first flexible circuit board 200 and the bottom of the first flexible circuit board 200 may be adhered to the bottom of the back plate 130 by the adhesive member, a method of manufacturing the flexible display device according to the third embodiment including the above-described elements may be the same as or similar to the above-described second embodiment.

In the above-described flexible display device according to the third embodiment, the bending part 115 extending from one side of the first substrate 110 may be bent, and the bezel width W can be reduced.

Moreover, the driving IC 210, the driving elements, and the protection cap 220 may all be provided at one flexible circuit board (the first flexible circuit board), thus simplifying a manufacturing process and reducing the manufacturing cost. Also, a spare space equal to an area necessary for connecting two flexible circuit boards can be additionally secured, and thus, a spatial restriction can be solved in terms of designing.

Fourth Embodiment

Figure 7:
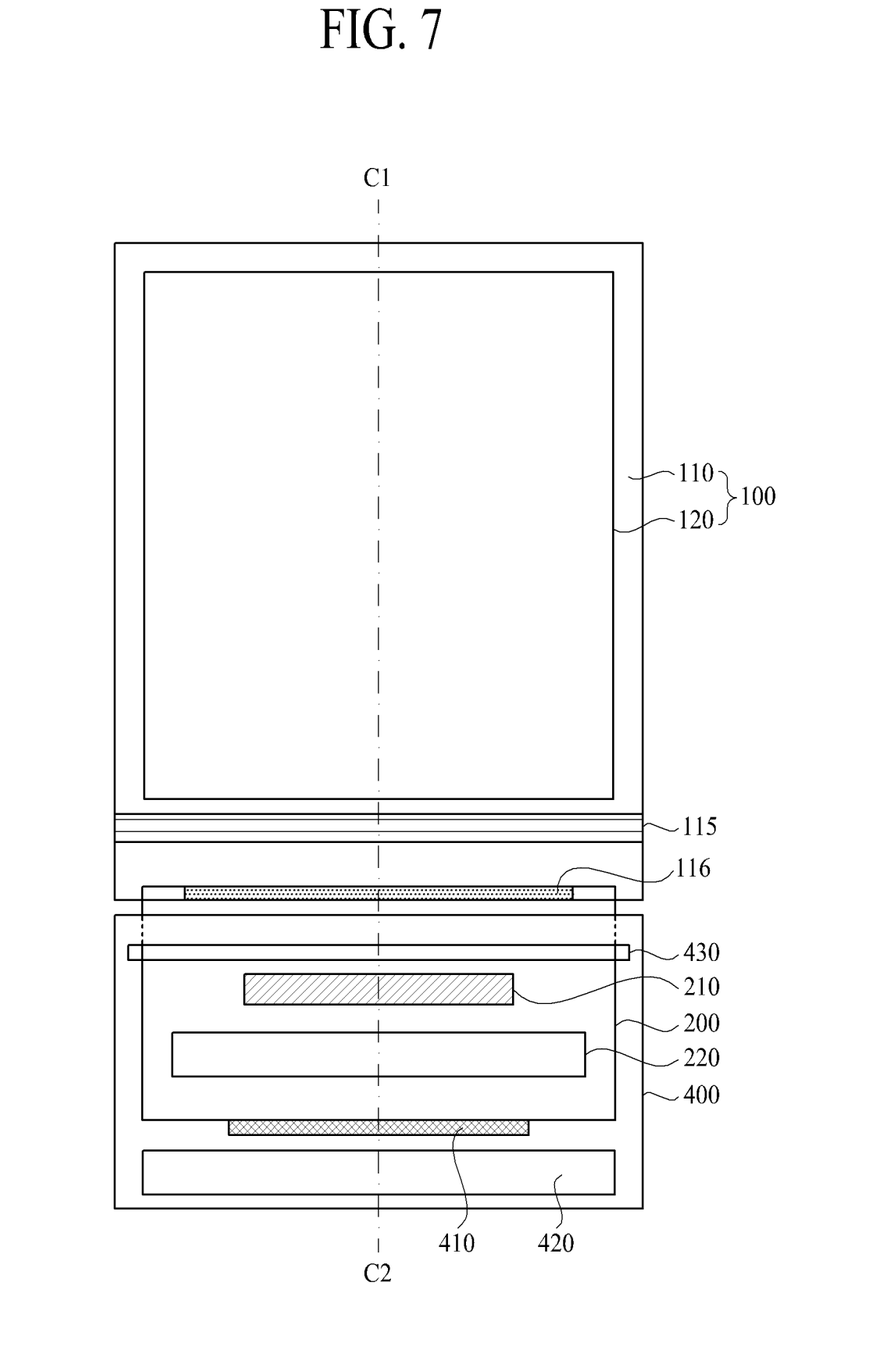
FIG. 7 is a plan view illustrating a flexible display device according to a fourth embodiment.
Figure 8:
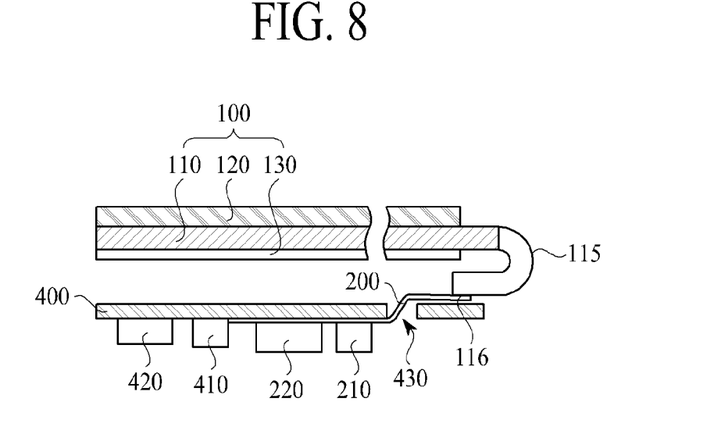
FIG. 8 is a cross-sectional view taken along line C1-C2 of FIG. 7.

FIG. 7 is a plan view illustrating a flexible display device according to a fourth embodiment. FIG. 8 is a cross-sectional view taken along line C1-C2 of FIG. 7. In FIG. 8, it is illustrated that a first substrate 110 may be bent to a rear surface of a display panel 100.

With reference to FIGS. 7 and 8, the flexible display device according to the fourth embodiment may include the display panel 100 and a panel driver.

The display panel 100 may be the same as or similar to the above-described first to third embodiments, and thus, its detailed description is not provided.

The display panel 100 may include the first substrate 110 and a second substrate 120 which may be facing-coupled to each other, and a back plate 130 may be provided under the first substrate 110.

The first substrate 110 may be a flexible thin film substrate, and may be formed, for example, of a plastic material or a metal foil. The first substrate 110 may include a display part, a non-display part, a bending part 115, and a pad part 116.

The bending part 115 may extend from the one side of the non-display part to have a certain area, and may be bent to under the first substrate 110. That is, the bending part 115 may be bent by a substrate bending apparatus (not shown) to have a certain curvature, and may overlap a lower portion of one side of the second substrate 120. A plurality of extension lines (not shown) electrically connected to the respective link lines may be provided at the bending part 115.

The pad part 116 of the first substrate 110 may be electrically connected to a first flexible circuit board 200 of the panel driver.

The panel driver may be connected to the pad part 116 of the first substrate 110, and supplies signals to the gate lines and the data lines. To this end, the panel driver may include a driving IC 210, a plurality of driving elements, and a protection cap 220 which may be provided at the first flexible circuit board 200, and a connector 410 and a control circuit 420 which may be provided at a control board 400. For example, the first flexible circuit board 200 may use a COF or an FPC.

The driving elements may supply a control signal and image signals, which may be input from the control circuit 420 of the control board 400, to the driving IC 210, and the protection cap 220 for covering the driving elements may be provided.

The control board 400 may generate image data and a timing sync signal which correspond to an image to be displayed by the display panel 100, and may transfer the image data and the timing sync signal to the driving IC 210 of the flexible circuit board 200. The control circuit 420 of the control board 400 may include passive elements, such as a resistor, a capacitor, and an inductor, and/or an IC. The driving circuit board 27 may generate a voltage necessary to drive the display panel 100 and/or the driving IC 210.

The driving IC 210 and the driving elements may be mounted on a top of the first flexible circuit board 200 by the chip bonding process or the surface mounting process, and may be bonded to a plurality of signal supply terminals and a plurality of signal input terminals.

A first end of the first flexible circuit board 200 may be electrically connected to the pad part 116 of the first substrate 110, and a second end of the first flexible circuit board 200 may be connected to the control board 400.

In one example, a pad part may also be provided at each of both ends of the first flexible circuit board 200 to be connected to the pad part 116 of the first substrate 110 and the connector 410 of the control board 400.

The first end of the first flexible circuit board 200 may be connected to the pad part 116 of the first substrate 110, and the second end of the first flexible circuit board 200 may be connected to the connector 410 of the control board 400. In one example, the pad part, driving IC 210, and driving elements of the first flexible circuit board 200 may be disposed on the same plane or different planes.

Here, the driving IC 210, the driving elements, and the protection cap 220 may be provided at a top of the first flexible circuit board 200, and a pad part of the second end of the first flexible circuit board 200 connected to the connector 410 of the control board 400 may be provided at the bottom of the first flexible circuit board 200.

The connector 410 for a connection with the first flexible circuit board 200 may be provided at the control board 400, and the connector 410 and the control board 420 may be provided at one side of the bottom of the control board 400. Also, the driving elements may be provided at a top of the control board 400 in the surface mounting type.

A hole 430 having a slit shape may be formed at the control board 400, such that the second end of the first flexible circuit board 200 may be connected to the connector 410 provided at the bottom of the control board 400.

The pad part 116 of the first substrate 110 and the first end of the first flexible circuit board 200 may be connected to the pad part of the bottom of the bending part 115. The first flexible circuit board 200 may pass through the hole 430 (formed at the control board 400) from the top to the bottom of the control board 400, and the second end of the first flexible circuit board 200 may be connected to the connector 410.

That is, the first end of the first flexible circuit board 200 may be connected to the pad part 116 of the first substrate 110 at the top of the control board 400, and the second end of the first flexible circuit board 200 may be connected to the connector 410 of the control board 400 at the bottom of the control board 400.

Although not shown, when the bending part 115 of the first substrate 110 is bent, the driving IC 210, driving elements, and protection cap 220 of the first flexible circuit board 200 may be disposed at a bottom of one side of the control board 400, and the bottom of the first flexible circuit board 200 may be adhered and fixed to the bottom of the control board 400. In addition, the top of the control board 400 may also be adhered and fixed to the bottom of the back plate 130 by an adhesive member.

Therefore, because the first flexible circuit board 200 may be fixed, an elastic restoring force of the bending part 115 may be restricted, and a bent shape of the bending part 115 can be maintained as-is.

In the above-described flexible display device according to the fourth embodiment, the bending part 115 extending from one side of the first substrate 110 may be bent, and the bezel width W can be reduced.

Moreover, the driving IC 210, the driving elements, and the protection cap 220 may all be provided at one flexible circuit board (e.g., the first flexible circuit board), thus simplifying a manufacturing process and reducing the manufacturing cost.

Fifth Embodiment

Figure 9:
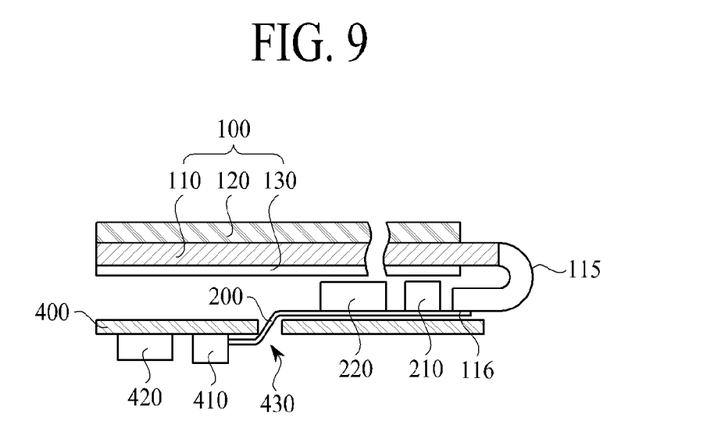
FIG. 9 is a cross-sectional view illustrating a flexible display device according to a fifth embodiment.

FIG. 9 is a cross-sectional view illustrating a flexible display device according to a fifth embodiment. In the FIG. 9 example, it is illustrated that a first substrate 110 may be bent to a rear surface of a display panel 100.

With reference to FIG. 9, the flexible display device according to the fifth embodiment may include the display panel 100 and a panel driver.

The display panel 100 may be the same as or similar to the above-described first to third embodiments, and thus, its detailed description is not provided.

The display panel 100 may include the first substrate 110 and a second substrate 120 which may be facing-coupled to each other, and a back plate 130 may be provided under the first substrate 110.

The first substrate 110 may be a flexible thin film substrate, and may be formed, for example, of a plastic material or a metal foil. The first substrate 110 may include a display part, a non-display part, a bending part 115, and a pad part 116.

The bending part 115 may extend from the one side of the non-display part to have a certain area, and may be bent to under the first substrate 110. That is, the bending part 115 may be bent by a substrate bending apparatus (not shown) to have a certain curvature, and may overlap a lower portion of one side of the second substrate 120. A plurality of extension lines (not shown) electrically connected to the respective link lines may be provided at the bending part 115.

The pad part 116 of the first substrate 110 may be electrically connected to a first flexible circuit board 200 of the panel driver.

The panel driver may be connected to the pad part 116 of the first substrate 110, and may supply signals to the gate lines and the data lines. To this end, the panel driver may include a driving IC 210, a plurality of driving elements, and a protection cap 220 which may be provided at the first flexible circuit board 200, and a connector 410 and a control circuit 420 which may be provided at a control board 400. For example, the first flexible circuit board 200 may use a COF or an FPC.

The driving elements may supply a control signal and image signals, which may be input from the control circuit 420 of the control board 400, to the driving IC 210, and the protection cap 220 for covering the driving elements may be provided.

The control board 400 may generate image data and a timing sync signal which correspond to an image to be displayed by the display panel 100, and may transfer the image data and the timing sync signal to the driving IC 210 of the flexible circuit board 200. The control circuit 420 of the control board 400 may include passive elements, such as a resistor, a capacitor, and an inductor, and/or an IC. The driving circuit board 27 may generate a voltage necessary to drive the display panel 100 and/or the driving IC 210.

The driving IC 210 and the driving elements may be mounted on a bottom of the first flexible circuit board 200 by the chip bonding process or the surface mounting process, and may be bonded to a plurality of signal supply terminals and a plurality of signal input terminals.

One side of the first flexible circuit board 200 may be electrically connected to the pad part 116 of the first substrate 110, and the other side may be electrically connected to the control board 400.

Here, a pad part may also be provided at each of both ends of the first flexible circuit board 200 to be connected to the pad part 116 of the first substrate 110 and the connector 410 of the control board 400.

A first end of the first flexible circuit board 200 may be connected to the pad part 116 of the first substrate 110, and a second end of the first flexible circuit board 200 may be connected to the connector 410 of the control board 400. In one example, the pad part, driving IC 210, and driving elements of the first flexible circuit board 200 may be disposed on the same plane or different planes.

Here, the driving IC 210, the driving elements, and the protection cap 220 may be provided at the bottom of the first flexible circuit board 200, and a pad part of the first end of the first flexible circuit board 200 connected to the pad part 116 of the first substrate 110 may also be provided at the bottom of the first flexible circuit board 200.

The connector 410 for a connection with the first flexible circuit board 200 may be provided at the control board 400, and the connector 410 and the control board 420 may be provided at one side of the bottom of the control board 400. Also, the driving elements may be provided at a portion (corresponding to a portion at which the connector 410 and the control circuit 420 are provided) of the top of the control board 400 in the surface mounting type.

A hole 430 having a slit shape may be formed at the control board 400, such that the second end of the first flexible circuit board 200 may be connected to the connector 410 provided at the bottom of the control board 400.

The driving IC 210, driving elements, and protection cap 220 of the first flexible circuit board 200 may be disposed at a top of one side of the control board 400, and the second end of the first flexible circuit board 200, whose a length may be expanded at a portion with the driving elements provided therein, may pass through the hole 430 (formed at the control board 400) from the top to the bottom of the control board 400, and the second end of the first flexible circuit board 200 may be connected to the connector 410.

When the bending part 115 of the first substrate 110 is bent, the driving IC 210, the driving elements, and the protection cap 220 may be disposed between the back plate 130 and a top of one side of the control board 400.

Although not shown, when the bending part 115 of the first substrate 110 is bent, a top of the protection cap 220 may be adhered to the bottom of the back plate 130 by an adhesive member, and thus, the first substrate 110 may be fixed. In addition, the top of the control board 400 may also be adhered and fixed to the bottom of the back plate 130 by an adhesive member.

Therefore, because the top of the protection cap 220 provided at the first flexible circuit board 200 may be adhered to the bottom of the back plate 130, an elastic restoring force of the bending part 115 may be restricted, and a bent shape of the bending part 115 can be maintained as-is.

In the above-described flexible display device according to the fifth embodiment, the bending part 115 extending from one side of the first substrate 110 may be bent, and the bezel width W can be reduced.

Moreover, the driving IC 210, the driving elements, and the protection cap 220 may all be provided at one flexible circuit board (the first flexible circuit board), thus simplifying a manufacturing process and reducing the manufacturing cost.

Sixth Embodiment

Figure 10:
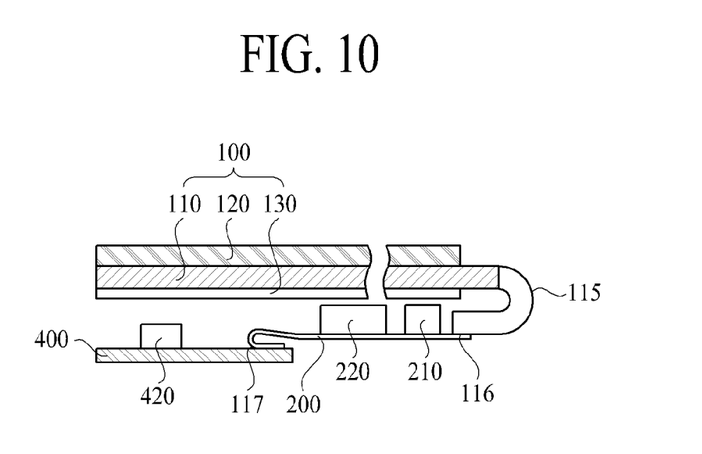
FIG. 10 is a cross-sectional view illustrating a flexible display device according to a sixth embodiment.

FIG. 10 is a cross-sectional view illustrating a flexible display device according to a sixth embodiment. In the FIG. 10 example, it is illustrated that a first substrate 110 may be bent to a rear surface of a display panel 100.

Except that a control board 400 may be connected to a first flexible circuit board 200, the flexible display device according to the sixth embodiment may be the same as or similar to the structures of the above-described second embodiment and third embodiment. Thus, a detailed description on a structure other than a structure in which the first flexible circuit board 200 and the control board 400 may be connected and disposed is not provided.

With reference to FIG. 10, the flexible display device according to the sixth embodiment may include a display panel 100 and a panel driver.

A first substrate 110 of the display panel 100 may include a display part, a non-display part, a bending part 115, and a pad part 116.

The bending part 115 may extend from the one side of the non-display part to have a certain area, and may be bent to under the first substrate 110. That is, the bending part 115 may be bent by a substrate bending apparatus (not shown) to have a certain curvature, and overlap a lower portion of one side of the second substrate 120. A plurality of extension lines (not shown) electrically connected to the respective link lines may be provided at the bending part 115.

The pad part 116 of the first substrate 110 may be electrically connected to the first flexible circuit board 200 of the panel driver.

The panel driver may be connected to the pad part 116 of the first substrate 110, and may supply signals to the gate lines and the data lines. To this end, the panel driver may include a driving IC 210, a plurality of driving elements, and a protection cap 220 which may be provided at the first flexible circuit board 200, and a control circuit 420 which may be provided at the control board 400. For example, the first flexible circuit board 200 may use a COF or an FPC.

The control board 400 may generate image data and a timing sync signal which correspond to an image to be displayed by the display panel 100, and may transfer the image data and the timing sync signal to the driving IC 210 of the flexible circuit board 200. The control circuit 420 of the control board 400 may include passive elements, such as a resistor, a capacitor, and an inductor, and/or an IC. The driving circuit board 27 may generate a voltage necessary to drive the display panel 100 and/or the driving IC 210.

The driving IC 210 and the driving elements may be mounted on a bottom of the first flexible circuit board 200 by the chip bonding process or the surface mounting process, and may be bonded to a plurality of signal supply terminals and a plurality of signal input terminals.

In one example, a pad part may also be provided at each of both ends of the first flexible circuit board 200 to be connected to the pad part 116 of the first substrate 110 and the control board 400.

A first end of the first flexible circuit board 200 may be connected to the pad part 116 of the first substrate 110, and a second end 117 of the first flexible circuit board 200 may be connected to the control board 400. In one example, the pad part, driving IC 210, and driving elements of the first flexible circuit board 200 may be disposed on the same plane or different planes.

Here, the driving IC 210, the driving elements, and the protection cap 220 may be provided at the bottom of the first flexible circuit board 200, and a pad part of the first end of the first flexible circuit board 200 connected to the pad part 116 of the first substrate 110 may also be provided at the bottom of the first flexible circuit board 200. In addition, a pad part of the second end 117 of the first flexible circuit board 200 connected to the control board 400 may also be provided at the bottom of the first flexible circuit board 200.

A control circuit 420 may be provided at a top of the control board 400, and the pad part of the second end 117 of the first flexible circuit board 200 may be connected to one side end of the control board 400. In this case, in order for the pad part of the second end 117 of the first flexible circuit board 200 to be connected to the top of the control board 400, the second end 117 of the first flexible circuit board 200 may be bent in a direction opposite to the bending part 115.

When the bending part 115 of the first substrate 110 is bent, the driving IC 210, the driving elements, and the protection cap 220 may be disposed at the bottom of the first substrate 110, and the control board 400 may be disposed in parallel to the first flexible circuit board 200 with a step height therebetween.

Although not shown, when the bending part 115 of the first substrate 110 is bent, a top of the protection cap 220 may be adhered to the bottom (or the bottom of the back plate) of the first substrate 110 by an adhesive member, and thus, the first substrate 110 is fixed. Therefore, an elastic restoring force of the bending part 115 may be restricted, and a bent shape of the bending part 115 can be maintained as-is.

In the above-described flexible display device according to the sixth embodiment, the bending part 115 extending from one side of the first substrate 110 may be bent, and the bezel width W can be reduced.

Moreover, the driving IC 210, the driving elements, and the protection cap 220 may all be provided at one flexible circuit board (the first flexible circuit board), thus simplifying a manufacturing process and reducing the manufacturing cost.

Seventh Embodiment

Figure 11:
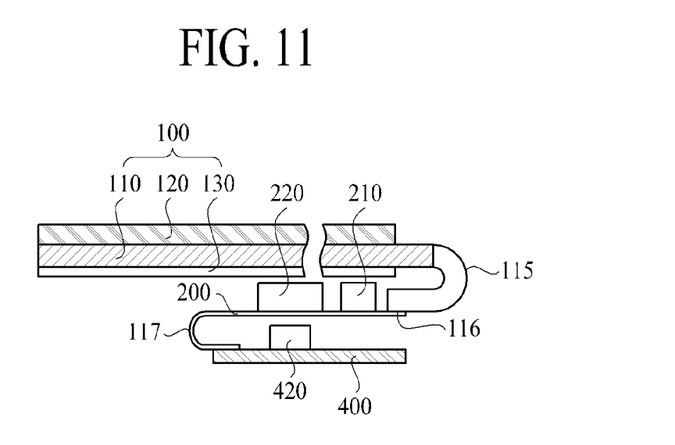
FIG. 11 is a cross-sectional view illustrating a flexible display device according to a seventh embodiment.

FIG. 11 is a cross-sectional view illustrating a flexible display device according to a seventh embodiment. In the FIG. 11 example, it is illustrated that a first substrate 110 may be bent to a rear surface of a display panel 100.

Except that a control board 400 may be connected to a first flexible circuit board 200, the flexible display device according to the seventh embodiment may be the same as or similar to the structure of the above-described sixth embodiment. Thus, a detailed description on a structure other than a structure in which the first flexible circuit board 200 and the control board 400 are connected and disposed is not provided.

With reference to FIG. 11, a panel driver may include a driving IC 210, a plurality of driving elements, and a protection cap 220 which may be provided at the first flexible circuit board 200, and a control circuit 420 which may be provided at a control board 400. For example, the first flexible circuit board 200 may use a COF or an FPC.

The driving IC 210 and the driving elements may be mounted on a bottom of the first flexible circuit board 200 by the chip bonding process or the surface mounting process, and may be bonded to a plurality of signal supply terminals and a plurality of signal input terminals.

In one example, a pad part may also be provided at each of both ends of the first flexible circuit board 200 to be connected to the pad part 116 of the first substrate 110 and the control board 400.

A first end of the first flexible circuit board 200 may be connected to the pad part 116 of the first substrate 110, and a second end 117 of the first flexible circuit board 200 may be connected to the control board 400. In one example, the pad part, driving IC 210, and driving elements of the first flexible circuit board 200 may be disposed on the same plane or different planes.

Here, the driving IC 210, the driving elements, and the protection cap 220 may be provided at the bottom of the first flexible circuit board 200, and a pad part of the first end of the first flexible circuit board 200 connected to the pad part 116 of the first substrate 110 may also be provided at the bottom of the first flexible circuit board 200. In addition, a pad part of the second end 117 of the first flexible circuit board 200 connected to the control board 400 may also be provided at the bottom of the first flexible circuit board 200.

A control circuit 420 may be provided at a top of the control board 400, and the pad part of the second end 117 of the first flexible circuit board 200 may be connected to one side end of the control board 400.

When the bending part 115 of the first substrate 110 is bent, the driving IC 210, the driving elements, and the protection cap 220 may be disposed at the bottom of the first substrate 110.

The control board 400 may be disposed under the driving IC 210, driving elements, and protection cap 220 of the first substrate 110. In order for the pad part of the second end 117 of the first flexible circuit board 200 to be connected to the top of the control board 400, the second end 117 of the first flexible circuit board 200 may be bent in a direction opposite to the bending part 115.

Although not shown, when the bending part 115 of the first substrate 110 is bent, a top of the protection cap 220 may be adhered to the bottom (or the bottom of the back plate) of the first substrate 110 by an adhesive member, and thus, the first substrate 110 may be fixed. Therefore, an elastic restoring force of the bending part 115 may be restricted, and a bent shape of the bending part 115 can be maintained as-is.

In the above-described flexible display device according to the seventh embodiment, the bending part 115 extending from one side of the first substrate 110 may be bent, and the bezel width W can be reduced.

Moreover, the driving IC 210, the driving elements, and the protection cap 220 may all be all provided at one flexible circuit board (the first flexible circuit board), thus simplifying a manufacturing process and reducing the manufacturing cost.

Eighth Embodiment

Figure 12:
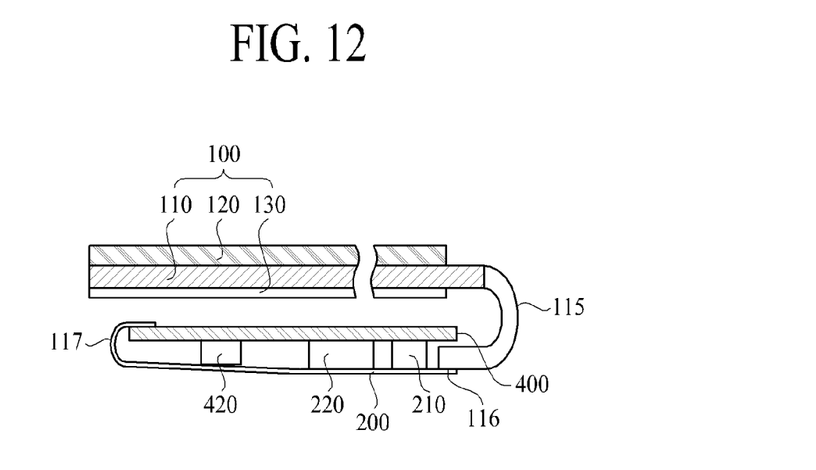
FIG. 12 is a cross-sectional view illustrating a flexible display device according to an eighth embodiment.

FIG. 12 is a cross-sectional view illustrating a flexible display device according to an eighth embodiment. In the FIG. 12 example, it is illustrated that a first substrate 110 may be bent to a rear surface of a display panel 100.

Except that a control board 400 may be connected to a first flexible circuit board 200, the flexible display device according to the eighth embodiment may be the same as or similar to the structures of the above-described sixth and seventh embodiments. Thus, a detailed description on a structure other than a structure in which the first flexible circuit board 200 and the control board 400 may be connected and disposed is not provided.

With reference to FIG. 12, a panel driver may include a driving IC 210, a plurality of driving elements, and a protection cap 220 which may be provided at the first flexible circuit board 200, and a control circuit 420 which may be provided at a control board 400. For example, the first flexible circuit board 200 may use a COF or an FPC.

The driving IC 210 and the driving elements may be mounted on a bottom of the first flexible circuit board 200 by the chip bonding process or the surface mounting process, and bonded to a plurality of signal supply terminals and a plurality of signal input terminals.

In one example, a pad part may also be provided at each of both ends of the first flexible circuit board 200 to be connected to the pad part 116 of the first substrate 110 and the control board 400.

A first end of the first flexible circuit board 200 may be connected to the pad part 116 of the first substrate 110, and a second end 117 of the first flexible circuit board 200 may be connected to the control board 400. In one example, the pad part, driving IC 210, and driving elements of the first flexible circuit board 200 may be disposed on the same plane or different planes.

Here, the driving IC 210, the driving elements, and the protection cap 220 may be provided at the bottom of the first flexible circuit board 200, and a pad part of the first end of the first flexible circuit board 200 connected to the pad part 116 of the first substrate 110 may also be provided at the bottom of the first flexible circuit board 200. In addition, a pad part of the second end 117 of the first flexible circuit board 200 connected to the control board 400 may also be provided at the bottom of the first flexible circuit board 200.

The control circuit 420 may be provided at a bottom of the control board 400, and the pad part of the second end 117 of the first flexible circuit board 200 may be connected to one side end of the control board 400.

When the bending part 115 of the first substrate 110 is bent, the driving IC 210, the driving elements, and the protection cap 220 which may be provided at the first flexible circuit board 200 may be disposed at a bottom of the first substrate 110. In addition, the control board 400 may be disposed between the bottom of the first substrate 110 and the first flexible circuit board 200.

That is, the flexible display device according to the eighth embodiment may have a structure in which the bending part 115 of the first substrate 110 may be bent, and thus, the control board 400 may be disposed in a space between the bottom of the first substrate 110 and the first flexible circuit board 200, and the first flexible circuit board 200 may be connected to the control board 400.

The driving IC 210 and the protection cap 220 may be connected to the control board 400, and the control circuit 420 may be disposed to be connected to the first flexible circuit board 200.

Here, the driving IC 210, the driving elements, and the protection cap 220 may be disposed at the bottom of the first flexible circuit board 200, and the control circuit 420 may be provided at the bottom of the control board 400. Therefore, the driving IC 210, the driving elements, the protection cap 220, and the control circuit 420 may be disposed in parallel.

In order for the pad part of the second end 117 of the first flexible circuit board 200 to be connected to the top of the control board 400, the second end 117 of the first flexible circuit board 200 may be bent in a direction opposite to the bending part 115.

Although not shown, when the bending part 115 of the first substrate 110 is bent, a top of the protection cap 220 may be adhered and fixed to the control board 400 by an adhesive member. Therefore, an elastic restoring force of the bending part 115 may be restricted, and a bent shape of the bending part 115 can be maintained as-is.

In the above-described flexible display device according to the eighth embodiment, the bending part 115 extending from one side of the first substrate 110 may be bent, and the bezel width W can be reduced.

Moreover, the driving IC 210, the driving elements, and the protection cap 220 may all be provided at one flexible circuit board (the first flexible circuit board), thus simplifying a manufacturing process and reducing the manufacturing cost.

Ninth Embodiment

Figure 13:
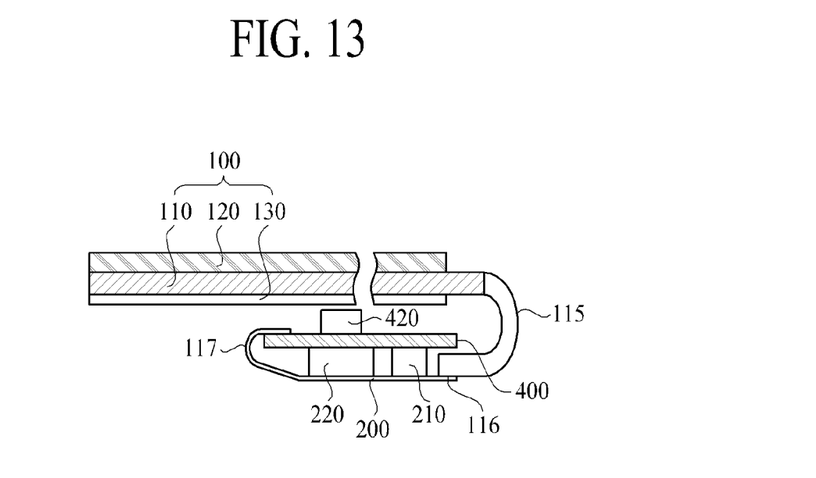
FIG. 13 is a cross-sectional view illustrating a flexible display device according to a ninth embodiment.

FIG. 13 is a cross-sectional view illustrating a flexible display device according to a ninth embodiment. In the FIG. 13 example, it is illustrated that a first substrate 110 may be bent to a rear surface of a display panel 100.

Except that a control board 400 may be connected to a first flexible circuit board 200, the flexible display device according to the eighth embodiment may be the same as or similar to the structures of the above-described sixth and eighth embodiments. Thus, a detailed description on a structure other than a structure in which the first flexible circuit board 200 and the control board 400 may be connected and disposed is not provided.

With reference to FIG. 13, a panel driver may include a driving IC 210, a plurality of driving elements, and a protection cap 220 which may be provided at the first flexible circuit board 200, and a control circuit 420 which may be provided at a control board 400. For example, the first flexible circuit board 200 may use a COF or an FPC.

The driving IC 210 and the driving elements may be mounted on a bottom of the first flexible circuit board 200 by the chip bonding process or the surface mounting process, and may be bonded to a plurality of signal supply terminals and a plurality of signal input terminals.

In one example, a pad part may also be provided at each of both ends of the first flexible circuit board 200 to be connected to the pad part 116 of the first substrate 110 and the control board 400.

A first end of the first flexible circuit board 200 may be connected to the pad part 116 of the first substrate 110, and a second end 117 of the first flexible circuit board 200 may be connected to the control board 400. In one example, the pad part, driving IC 210, and driving elements of the first flexible circuit board 200 may be disposed on the same plane or different planes.

Here, the driving IC 210, the driving elements, and the protection cap 220 may be provided at the bottom of the first flexible circuit board 200, and a pad part of the first end of the first flexible circuit board 200 connected to the pad part 116 of the first substrate 110 may also be provided at the bottom of the first flexible circuit board 200. In addition, a pad part of the second end 117 of the first flexible circuit board 200 connected to the control board 400 may also be provided at the bottom of the first flexible circuit board 200.

The control circuit 420 may be provided at a top of the control board 400, and the pad part of the second end 117 of the first flexible circuit board 200 may be connected to one side end of the control board 400.

When the bending part 115 of the first substrate 110 is bent, the driving IC 210, the driving elements, and the protection cap 220 which may be provided at the first flexible circuit board 200 may be disposed at a bottom of the first substrate 110. In addition, the control board 400 may be disposed between the bottom of the first substrate 110 and the first flexible circuit board 200.

That is, the flexible display device according to the ninth embodiment may have a structure in which the bending part 115 of the first substrate 110 may be bent, and thus, the control board 400 may be disposed in a space between the bottom of the first substrate 110 and the first flexible circuit board 200, and the first flexible circuit board 200 may be connected to the control board 400.

In one example, the control board 400 may be disposed to overlap the driving IC 210 or protection cap 220 of the first flexible circuit board 200, and the control circuit 420 of the control board 400 may be connected to the bottom (or the bottom of the back plate) of the first substrate 110, and disposed in order for the bottom of the control board 400 to be connected to the driving IC 210 and protection cap 220 of the first flexible circuit board 200.

In order for the pad part of the second end 117 of the first flexible circuit board 200 to be connected to the top of the control board 400, the second end 117 of the first flexible circuit board 200 may be bent in a direction opposite to the bending part 115.

Although not shown, when the bending part 115 of the first substrate 110 is bent, a top of the protection cap 220 may be adhered to the control board 400 by an adhesive member, and the control circuit 420 of the control board 400 may be adhered and fixed to the bottom (or the bottom of the back plate) of the first substrate 110. Therefore, an elastic restoring force of the bending part 115 may be restricted, and a bent shape of the bending part 115 can be maintained as-is.

In the above-described flexible display device according to the ninth embodiment, the bending part 115 extending from one side of the first substrate 110 may be bent, and the bezel width W can be reduced.

Moreover, the driving IC 210, the driving elements, and the protection cap 220 may all be provided at one flexible circuit board (the first flexible circuit board), thus simplifying a manufacturing process and reducing the manufacturing cost.

As described above, in the flexible display device and the method of manufacturing the same according to the embodiments, the bezel width can decrease.

According to the flexible display device and the method of manufacturing the same, the manufacturing process can be simplified, and the manufacturing cost can be reduced.

In addition to the aforesaid features and effects of the present embodiments, other features and effects of the present embodiments can be newly construed from these embodiments.

It will be apparent to those skilled in the art that various modifications and variations can be made in the present embodiments without departing from the spirit or scope of the inventions. Thus, it is intended that the present invention covers the modifications and variations of the embodiments provided that they come within the scope of the appended claims and their equivalents.

What is claimed is:

1. A flexible display device, comprising:
   a display panel configured to include
   a first substrate having a plurality of pixels; and
   a second substrate that is facing and coupled to the first substrate; and
   a first flexible circuit board connected to the first substrate, wherein a driving IC configured to supply a driving signal to the display panel is on the first flexible circuit board, wherein the first substrate comprises:
   a display part covered by the second substrate, and including the plurality of pixels;
   a non-display part coupled to the second substrate;
   a bending part configured to:
      extend from one side of the non-display part, and
      bend under the first substrate at a curvature; and
   a pad part disposed on one side of the bending part under the first substrate and connected to one side of the first flexible circuit board.

2. The flexible display device of claim 1, further comprising:
   a plurality of driving elements configured to supply a control signal and an image signal to the driving IC, the control signal and the image signal being input from outside the plurality of driving elements; and
   a protection cap configured to protect the driving elements, wherein the protection cap and the plurality of driving elements are provided at a bottom of the first flexible circuit board.

3. The flexible display device of claim 2, wherein
the driving IC is provided at the bottom of the first flexible circuit board, and
the bending part is bent such that the driving IC and the driving elements are disposed under the first substrate.

4. The flexible display device of claim 2, further comprising:
a control board and a control circuit on the control board, the control circuit being configured to supply the control signal and the image signal to the driving elements, the control circuit being provided at a top or a bottom of the control board,
wherein the control board is connected to an other side of the first flexible circuit board opposite to the pad part of the first substrate.

5. The flexible display device of claim 4, wherein the driving IC and the driving elements are disposed over or under the control board.

6. The flexible display device of claim 5, wherein:
a hole and a connector are further provided on the control board; and
the other side of the first flexible circuit board passes through the hole from the top to the bottom of the control board, and is connected to the connector.

7. The flexible display device of claim 2, wherein the protection cap is disposed under the display panel.

8. The flexible display device of claim 2, wherein the protection cap supports the display panel.

9. The flexible display device of claim 4, wherein:
the first flexible circuit board is disposed at a bottom of the first substrate; and
the control board is disposed between the bottom of the first substrate and the first flexible circuit board.

10. The flexible display device of claim 9, wherein:
the control board is connected to the other side of the first flexible circuit board: and
the driving IC, the driving elements, and the control circuit are disposed in parallel.

11. The flexible display device of claim 9, wherein:
the control board is connected to the other side of the first flexible circuit board; and
the control circuit overlaps the driving IC and the driving elements.

12. The flexible display device of claim 4, wherein:
the first flexible circuit board is disposed at a bottom of the first substrate; and
the control board is disposed at a bottom of the first flexible circuit board.

13. The flexible display device of claim 1, further comprising:
a second flexible circuit board on which a plurality of driving elements and a protection cap are mounted, the second flexible circuit board being connected to an other side of the first flexible circuit board opposite to the pad part of the first substrate.

14. The flexible display device of claim 1, further comprising a back plate provided at a bottom of the first substrate.

15. The flexible display device of claim 1, further comprising a light blocking member provided at a bottom of the first substrate.

16. The flexible display device of claim 1, wherein the first flexible circuit board is a chip-on-film (COF) or a flexible printed circuit (FPC).

\* \* \* \* \*